US010970103B2

(12) United States Patent
Smith et al.

(10) Patent No.: US 10,970,103 B2
(45) Date of Patent: Apr. 6, 2021

(54) TECHNOLOGIES FOR HYBRID VIRTUALIZATION AND SECURE ENCLAVE POLICY ENFORCEMENT FOR EDGE ORCHESTRATION

(71) Applicant: Intel Corporation, Santa Clara, CA (US)

(72) Inventors: Ned Smith, Beaverton, OR (US); Bing Zhu, Shanghai (CN); Vincent Scarlata, Beaverton, OR (US); Kapil Sood, Portland, OR (US); Francesc Guim Bernat, Barcelona (ES)

(*) Notice: Subject to any disclaimer, the term of this patent is extended or adjusted under 35 U.S.C. 154(b) by 32 days.

(21) Appl. No.: 16/234,731

(22) Filed: Dec. 28, 2018

(65) Prior Publication Data

US 2019/0155636 A1  May 23, 2019

(51) Int. Cl.
*G06F 9/455* (2018.01)

(52) U.S. Cl.
CPC ............ *G06F 9/45558* (2013.01); *G06F 2009/45583* (2013.01); *G06F 2009/45587* (2013.01); *G06F 2009/45591* (2013.01); *G06F 2009/45595* (2013.01)

(58) Field of Classification Search
CPC ..................................... G06F 9/45558–9/46
See application file for complete search history.

(56) References Cited

U.S. PATENT DOCUMENTS

| 2008/0104586 | A1* | 5/2008 | Thorton | G06F 9/45533 718/1 |
| 2016/0381005 | A1* | 12/2016 | Vij | G06F 21/57 726/7 |
| 2017/0185776 | A1* | 6/2017 | Robinson | G06F 21/575 |

(Continued)

OTHER PUBLICATIONS

Distributed Usage Control Enforcement through Trusted Platform Modules and SGX Enclaves Paul Georg Wagner, Pascal Birnstill, Jürgen Beyerer (Year: 2018).*

(Continued)

*Primary Examiner* — Emerson C Puente
*Assistant Examiner* — Paul V Mills
(74) *Attorney, Agent, or Firm* — Hanley, Flight & Zimmerman, LLC

(57) ABSTRACT

Technologies for hybrid virtualization and secure enclave include a computing device and an edge orchestrator. The edge orchestrator securely provisions a container-enclave policy to the computing device. A VMM of the computing device constructs a platform services enclave that includes the container-enclave policy. The platform services enclave requests a local attestation report from an application enclave, and the application enclave generates the attestation report using secure enclave support of a compute engine of the computing device. The attestation report is indicative of a virtualization context of the application enclave, and may include a VM flag, a VMM flag, and a source address of the application enclave. The platform services enclave enforces the container-enclave policy based on the virtualization context of the application enclave. The platform services enclave may control access to functions of the computing device based on the virtualization context. Other embodiments are described and claimed.

25 Claims, 4 Drawing Sheets

(56) References Cited

U.S. PATENT DOCUMENTS

2018/0314846 A1* 11/2018 Schultz ............... G06F 9/45558
2019/0370467 A1* 12/2019 Li .......................... G06F 21/57

OTHER PUBLICATIONS

Intel SGX Explained Victor Costan and Srinivas Devadas (Year: 2016).*

Intel® Software Guard Extensions Programming Reference Intel Corporation Chapters 1-4 (Year: 2014).*

* cited by examiner

TECHNOLOGIES FOR HYBRID VIRTUALIZATION AND SECURE ENCLAVE POLICY ENFORCEMENT FOR EDGE ORCHESTRATION

BACKGROUND

Typical computing devices may use virtualization to provide isolation and multi-tenancy support. Orchestrators may use virtual machines and virtual network functions as the primary unit of control. Cloud workloads such as infrastructure as a service (IaaS), platform as a service (PaaS), and function as a service (FaaS) may rely on virtualization for isolation and multi-tenancy requirements.

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. The contents of an SGX secure enclave may be authenticated and therefore trusted by the independent software vendor (ISV) that provides the secure enclave. Secure enclaves typically execute in user mode (e.g., ring level 3) and are not aware of platform virtualization context.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
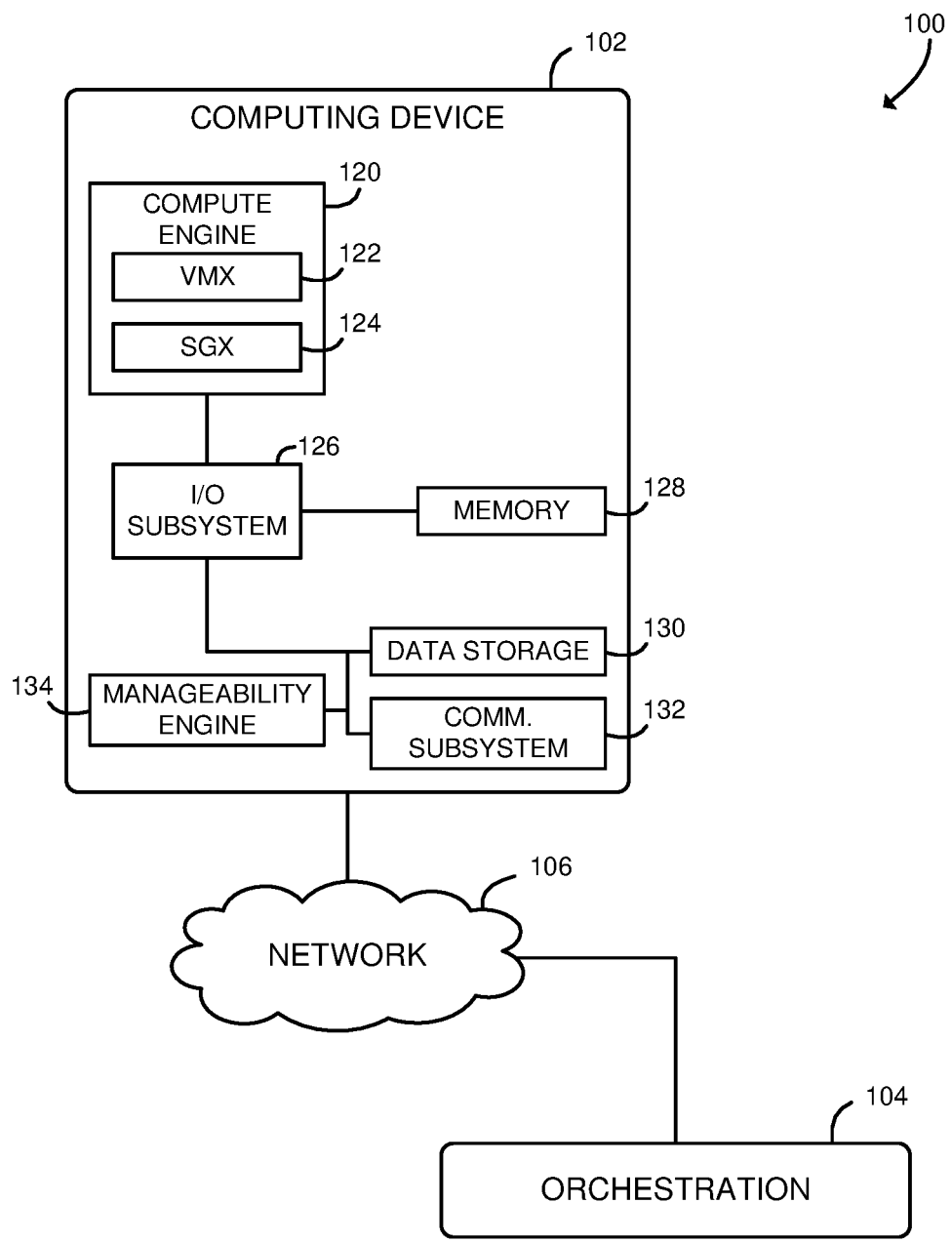
FIG. 1 is a simplified block diagram of at least one embodiment of a system for hybrid virtualization and secure enclave policy enforcement.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for hybrid virtualization and secure enclave policy enforcement includes a computing device 102 and edge orchestrator 104. In use, as described further below, the edge orchestrator 104 may securely provision a container-enclave policy (CEP) to the computing device 102. An enforcement component of the computing device 102 such as a platform services enclave (PSE) receives attestation reports from application enclaves executed by the computing device 102. The attestation reports are indicative of the virtualization context of each application enclave. The PSE enforces the CEP based on the virtualization context of each application enclave. Thus, the system 100 may differentiate between enclaves that are expected to originate from containers under the control of a VMM from those that are not, which may prevent attacks from rogue enclaves or other malicious processes. Additionally, by allowing the attestation report to indicate virtualization context, the system 100 does not require the trusted code base (TCB) of the enclave to be expanded to include pre-boot firmware, VM, or VMM components.

The computing device 102 may be embodied as any type of device capable of performing the functions described herein. For example, the computing device 102 may be embodied as, without limitation, a switch, a router, a network device, a computer, a mobile computing device, a server, a workstation, a multiprocessor system, a distributed computing device, and/or a consumer electronic device. Additionally or alternatively, the computing device 102 may be embodied as a one or more compute sleds, memory sleds, or other racks, sleds, computing chassis, or other components of a physically disaggregated computing device. As shown in FIG. 1, the illustrative computing device 102 includes a compute engine 120, an I/O subsystem 126, a memory 128, a data storage device 130, and a communication subsystem 132. Additionally, in some embodiments, one or more of the illustrative components may be incorporated in, or otherwise form a portion of, another component. For example, the memory 128, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA), or other configurable circuitry, application-specific integrated circuit (ASIC), or other processor or processing/controlling circuit. The compute engine 120 includes VMX support 122. The VMX support 122 supports virtualized execution of operating systems by providing two modes of execution: VMX root mode and VMX non-root mode. The VMX root mode allows executing software to have broad control of the computing device 102 and its hardware resources. Accordingly, a virtual machine monitor (VMM), hypervisor, or host operating system may execute in VMX root mode. The VMX non-root mode restricts access to certain hardware instructions while still implementing the ordinary ring/privilege system of the compute engine 120. Thus, one or more guest virtual machines (VMs) and/or guest operating systems (OSs) may execute in the VMX non-root mode. Those guest OSs may execute in ring zero, similar to execution without virtualization. The execution of certain hardware instructions and certain other system events may trigger hardware-assisted transitions to VMX root mode. Those hardware-assisted transitions are commonly known as virtual machine exits (VM exits) or hypercalls. Upon encountering a VM exit, the compute engine 120 may switch context from the guest VM to the VMM in order to handle the VM exit. The VMX support 122 may be embodied as, for example, Intel VT-x technology and/or Intel VT-d technology.

The compute engine 120 also includes secure enclave support 124, which allows the compute engine 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the compute engine 120 while being executed or while being stored in certain protected cache memory of the compute engine 120. The code and data included in the secure enclave may be encrypted when stored in a shared cache or the main memory 128. The secure enclave support 124 may be embodied as a set of processor instruction extensions that allows the compute engine 120 to establish one or more secure enclaves in the memory 128. For example, the secure enclave support 124 may be embodied as Intel Software Guard Extensions (SGX) technology.

The memory 128 may be embodied as any type of volatile or non-volatile memory or data storage capable of performing the functions described herein. In operation, the memory 128 may store various data and software used during operation of the computing device 102 such as operating systems, applications, programs, libraries, and drivers. As shown, the memory 128 may be communicatively coupled to the compute engine 120 via the I/O subsystem 126, which may be embodied as circuitry and/or components to facilitate input/output operations with the compute engine 120, the memory 128, and other components of the computing device 102. For example, the I/O subsystem 126 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 128 may be directly coupled to the compute engine 120, for example via an integrated memory controller hub. Additionally, in some embodiments, the I/O subsystem 126 may form a portion of a system-on-a-chip (SoC) and be incorporated, along with the compute engine 120, the memory 128, and/or other components of the computing device 102, on a single integrated circuit chip.

The data storage device 130 may be embodied as any type of device or devices configured for short-term or long-term storage of data such as, for example, memory devices and circuits, memory cards, hard disk drives, solid-state drives, non-volatile flash memory, or other data storage devices. The communications subsystem 132 may be embodied as any communication circuit, device, or collection thereof, capable of enabling communications between the computing device 102 and other remote devices over the network 106. The communications subsystem 132 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

The manageability engine 134 may be embodied as any hardware component(s) or circuitry capable of providing manageability and security-related services to the computing device 102. In particular, the manageability engine 134 may include a microprocessor, microcontroller, or other embedded controller capable of executing firmware and/or other code independently and securely from the compute engine 120. For example, the manageability engine 134 may be embodied as a manageability engine (ME), a converged security and manageability engine (CSME), an Intel® innovation engine (IE), a board management controller (BMC), an embedded controller (EC), a trusted hardware component such as a trusted platform module (TPM), a hardware secure module (HSM), or other independent controller of the computing device 102. In some embodiments, the manageability engine 134 may include a TPM implemented with secure firmware, such as Intel Platform Trust Technology (PTT). Thus, the manageability engine 134 may be used to establish a trusted execution environment for the computing device 102. The manageability engine 134 may communicate with the compute engine 120 and/or other components of the computing device 102 over an I/O link such as PCI Express or over a dedicated bus, such as a host embedded controller interface (HECI). Further, in some embodiments, the manageability engine 134 is also capable of communicating using the communication subsystem 132 or a dedicated communication circuit independently of the state of the computing device 102 (e.g., independently of the state of the main compute engine 120), also known as "out-of-band" communication.

The edge orchestrator 104 may be embodied as any type of computation or computer device capable of performing the functions described herein, including, without limitation, a switch, a router, a network device, a computer, a mobile computing device, a server, a workstation, a multiprocessor system, a distributed computing device, and/or a consumer electronic device. Additionally or alternatively, the edge orchestrator 104 may be embodied as a one or more compute sleds, memory sleds, or other racks, sleds, computing chassis, or other components of a physically disaggregated computing device. As such, the edge orchestrator 104 may include components and features similar to the computing device 102, such as a compute engine 120, I/O subsystem 126, memory 128, data storage 130, communication subsystem 132, and/or various peripheral devices. Those individual components of the edge orchestrator 104 may be similar to the corresponding components of the computing device 102, the description of which is applicable to the corresponding components of the edge orchestrator 104 and is not repeated for clarity of the present description.

As discussed in more detail below, the computing device 102 and the edge orchestrator 104 may be configured to transmit and receive data with each other and/or other devices of the system 100 over the network 106. The network 106 may be embodied as any number of various wired and/or wireless networks. For example, the network 106 may be embodied as, or otherwise include a mobile access network, a network edge infrastructure, a wired or wireless local area network (LAN), and/or a wired or wireless wide area network (WAN). As such, the network 106 may include any number of additional devices, such as additional base stations, access points, computers, routers, and switches, to facilitate communications among the devices of the system 100. In the illustrative embodiment, the network 106 is embodied as an edge network fabric.

Figure 2:
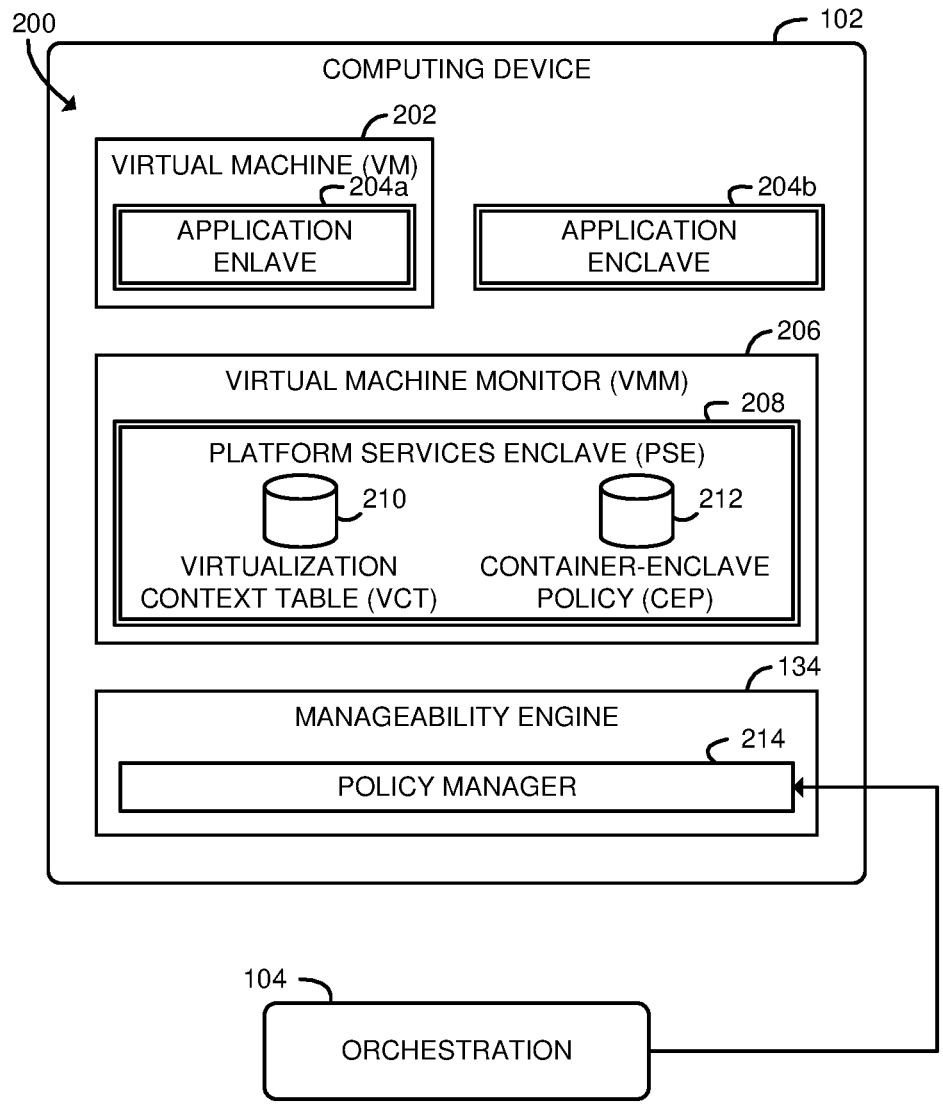
FIG. 2 is a simplified block diagram of at least one embodiment of various environments of the system of FIG. 1.

Referring now to FIG. 2, in an illustrative embodiment, the computing device 102 establishes an environment 200 during operation. The illustrative environment 200 includes virtual machines (VMs) 202, application enclaves 204, a virtual machine monitor (VMM) 206, a platform services enclave (PSE) 208, and a policy manager 214. The various components of the environment 200 may be embodied as hardware, firmware, software, or a combination thereof. As such, in some embodiments, one or more of the components of the environment 200 may be embodied as circuitry or collection of electrical devices such as VM circuitry 202, application enclave circuitry 204, VMM circuitry 206, PSE circuitry 208, and/or policy manager circuitry 214). It should be appreciated that, in such embodiments, one or more of the VM circuitry 202, the application enclave circuitry 204, the VMM circuitry 206, the PSE circuitry 208, and/or the policy manager circuitry 214 may form a portion of the compute engine 120, the I/O subsystem 126, the manageability engine 134, and/or other components of the computing device 102. Additionally, in some embodiments, one or more of the illustrative components may form a portion of another component and/or one or more of the illustrative components may be independent of one another.

The virtual machine 202 may be embodied as a VM, virtual network function (VNF), service VM (SVM), or other virtualized workload that may be executed by the computing device 102. Similarly, the VMM 206 may be embodied as any virtual machine monitor, hypervisor, or other component that manages execution of one or more virtualized workloads on the computing device 102. The VMM 206 may manage virtualized workloads using the VMX support 122 of the compute engine 120, for example by executing in a VMX root mode or other privileged operating mode. Additionally, although illustrated as including a single VM 202, it should be understood that the environment 200 may include multiple VMs 202.

Each application enclave 204 may be embodied as an SGX secure enclave or other trusted execution environment that may be executed by the computing device 102. Each application enclave 204 executes within a user process or other application process executed by the computing device 102. As shown, certain application enclaves 204 may execute within a VM 202, and certain application enclaves 204 may execute outside of a VM 202 (e.g., without virtualization). Thus, each application enclave 204 executes in a non-privileged mode, such as VMX non-root mode, guest mode, user mode, ring level 3, or other non-privileged mode.

Similarly, the PSE 208 may be embodied as an SGX secure enclave or other trusted execution environment that may be executed by the computing device 102. The PSE 208 executes in a non-privileged mode, such as VMX non-root mode, guest mode, user mode, ring level 3, or other non-privileged mode. However, unlike the application enclaves 204, the PSE 208 may be embodied as an architectural enclave or other enclave that is privileged by the compute engine 120 and/or the VMM 206 to access certain hardware resources of the computing device 102, such as the manageability engine 134.

The policy manager 214 is configured to securely provision a container-enclave policy 212 to the computing device 102. Securely provisioning the container-enclave policy 212 may include receiving the policy 212 by the manageability engine 134 from an external edge orchestrator 104. The policy manager 214 may be further configured to inject the container enclave policy 212 into an image of the VMM 206.

The VMM 206 is configured to construct the PSE 208 in response to provisioning the container-enclave policy 212. As shown, the PSE 208 includes the container-enclave policy 212. In some embodiments, constructing the PSE 208 may include loading the container-enclave policy 212 with hardware I/O virtualization protection (e.g., the VMX 122 of the compute engine 120). In some embodiments, constructing the PSE 208 may include securely provisioning the container-enclave policy 212 to the PSE 208 with a provisioning key. The VMM 206 may be further configured to maintain a list of VM source addresses associated with VMs 202 that are successfully loaded by the computing device 102.

The PSE 208 is configured to request a local attestation report from an application enclave 204. The local attestation report is indicative of a virtualization context of the application enclave 204. For example, the attestation report may include one or more flags indicative of whether the application enclave 204 is launched within a VM 202 or within a VMM 206. The attestation report may include a source address of a creating process of the application enclave 204, which may be a memory page offset of an ECREATE processor instruction associated with the application enclave 204. The PSE 208 is further configured to update a virtualization context table 210 as a function of the local attestation report received from the application enclave 204. The PSE 208 is further configured to enforce the container-enclave policy 212 based on the virtualization context of the application enclave 204 (e.g., using the virtualization context table 210).

Enforcing the container-enclave policy 212 may include controlling access to a local function of the computing device 102 or controlling access to a hardware function of a hardware security module of the computing device 102 (e.g., the manageability engine 134) based on the virtualization context of the application enclave 204. Enforcing the container-enclave policy 212 may include determining whether the application enclave 204 is launched within a VMM 206 or within a VM 202. Enforcing the container-enclave policy 212 may include comparing a source address of a creating process of the application enclave 204 to a predetermined source address associated with the application enclave 204, such as a VM source address of a VM 202 that has been successfully loaded.

The application enclave 204 is configured to generate the attestation report in response to the request from the PSE 208. To generate the attestation report, the application enclave 204 is configured to invoke the secure enclave support 124 of the compute engine 120, and, in response, the compute engine 120 generates the attestation report. For example, the application enclave 204 may invoke an EREPORT processor instruction of the compute engine 120.

Figure 3:
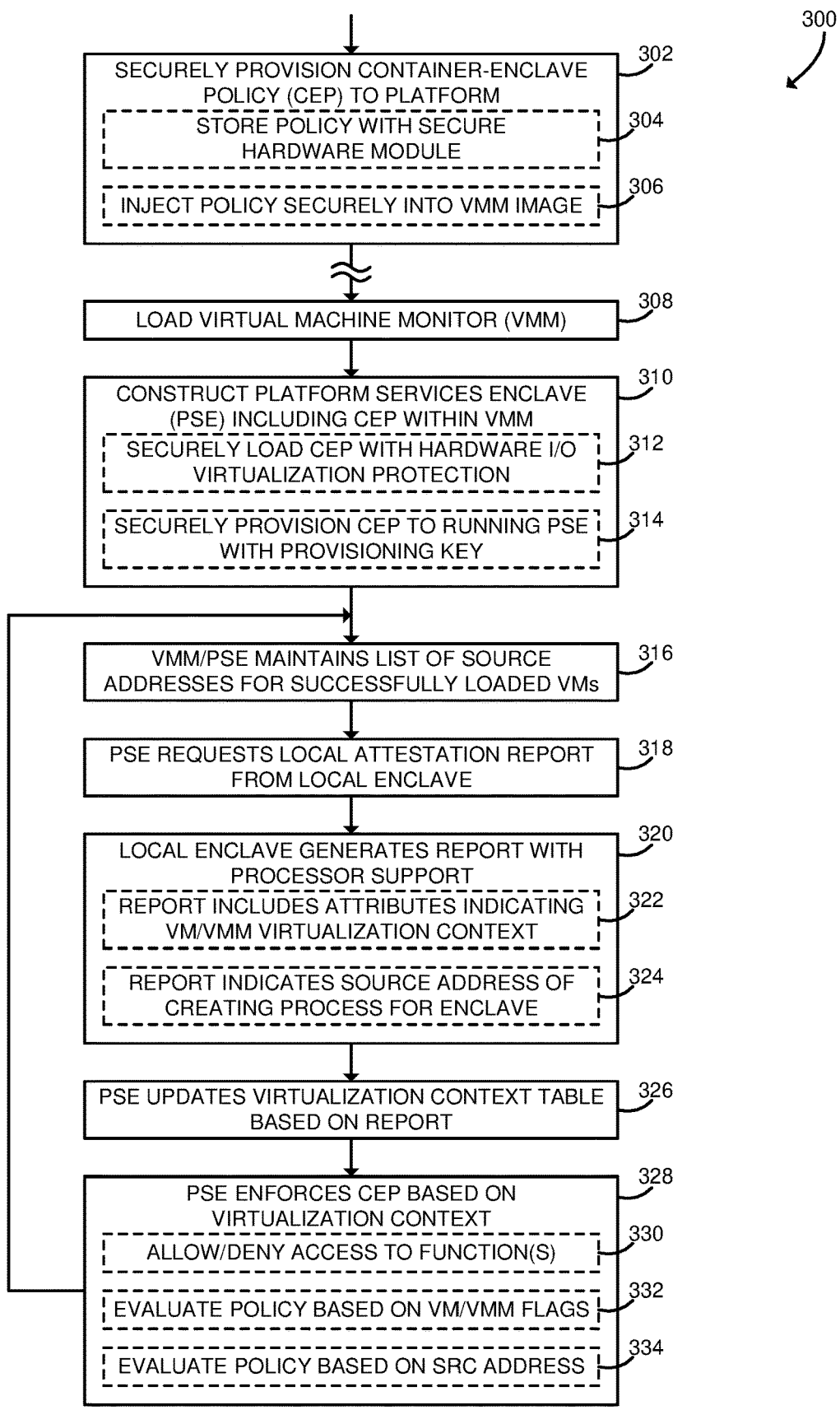
FIG. 3 is a simplified flow diagram of at least one embodiment of a method for hybrid virtualization and secure enclave policy enforcement that may be executed by a computing device of FIGS. 1-2.

Referring now to FIG. 3, in use, the computing device 102 may execute a method 300 for hybrid virtualization and secure enclave policy enforcement. It should be appreciated that, in some embodiments, the operations of the method 300 may be performed by one or more components of the environment 200 of the computing device 102 as shown in FIG. 2. The method 300 begins in block 302, in which the computing device 102 securely provisions the container-enclave policy 212 to the computing device 102. For example, the computing device 102 may securely receive the container-enclave policy 212 from the edge orchestrator 104 and store the container-enclave policy 212 in secure storage accessible to the compute engine 120, chipset, or other components of the computing device 102. In some embodiments, the manageability engine 134 may receive the container-enclave policy 212 from the edge orchestrator using out-of-band communication. In some embodiments, in block 304 the computing device 102 may store the container-enclave policy 212 with a secure hardware module such as the manageability engine 134 (e.g., a TPM or PTT). The container-enclave policy 212 may be stored in secure nonvolatile storage that is accessible to or otherwise managed by the manageability engine 134. In some embodiments, in block 306 the manageability engine 134 may inject the container-enclave policy 212 securely into an image of the VMM 206. For example, the container-enclave policy 212 may be inserted into a binary image of the VMM 206 stored in the data storage 130, so that the container-enclave policy 212 will be loaded with the VMM 206 image.

In block 308, the computing device 102 loads and executes the VMM 206. For example, the computing device 102 may load the VMM 206 in response to booting or another system start event. In block 310 the computing device 102 constructs the platform services enclave (PSE) 208 within the VMM 206. As described above, the PSE 208 may be constructed within a non-privileged mode managed by the VMM 206, such as ring level 3. For example, the VMM 206 may invoke one or more processor instructions with the secure enclave support 124 of the compute engine 120 to load memory pages into a secure enclave address range associated with the PSE 208 (e.g., ECREATE, EADD, or other instructions). Loading memory pages may update an enclave measurement of the PSE 208. After loading the PSE 208 into memory, the VMM 206 may invoke one or more processor instructions to finalize the enclave measurement and initialize the PSE 208 for execution (e.g., EINIT). The VMM 206 may cause the PSE 208 to start execution, for example by invoking one or more processor instructions to enter the PSE 208 (e.g., EENTER).

After construction and/or initialization, the PSE 208 includes the container-enclave policy 212. In some embodiments, in block 312 the computing device 102 may securely load the container-enclave policy 212 with hardware I/O virtualization protection, such as Intel VT-d directed I/O protection. For example, the container-enclave policy 212 may be loaded from the manageability engine 134 and/or from another I/O device of the computing device 102. In some embodiments, in block 314 the container-enclave policy 212 may be securely provisioned to the PSE 208 as it is executing. The container-enclave policy 212 may be protected with a provisioning key managed by the secure enclave support 124 of the compute engine 120.

In block 316, the VMM 206 and/or the PSE 208 maintains a list of source addresses for successfully loaded VMs 202. The list may include, for example, memory page offsets included in each VM 202. As described further below, the list of memory page offsets may be used to identify which VM 202 includes a particular application enclave 204.

In block 318, the PSE 208 requests a local attestation report from an application enclave 204 executed by the computing device 102. As described further below, the attestation report includes information describing the virtualization context of the application enclave 204. The PSE 208 may request the attestation report as each application enclave 204 is launched, in response to an application enclave 204 requesting services from the VMM 206 and/or the PSE 208, periodically during execution of each application enclave 204, and/or in response to other policy enforcement events.

In block 320, the application enclave 204 generates the local attestation report using the secure enclave support 124 of the compute engine 120. For example, the application enclave 204 may invoke one or more processor instructions with the secure enclave support 124 of the compute engine 120 to generate the report (e.g., EREPORT). The report includes data indicative of the virtualization context of the application enclave 204, including whether or not the application enclave 204 is executing within a VM 202 or a VMM 206 and including a source address of a process that created the application enclave 204. The virtualization context data may be added to the report and signed by the compute engine 120, which may prevent malicious software from generating false attestation reports. Virtualization context data may be made available through microcode, xucode instructions, or through microarchitecture circuitry of the compute engine 120. Accordingly, the virtualization context data may not be falsified or tampered with by software such as the application enclave 204, the VMM 206 and/or the VMs 202. In some embodiments, in block 322, the attestation report may include an attributes field having flags that indicate the VM/VMM virtualization context of the application enclave 204. For example, the attributes may include a VM flag that is set if the application enclave 204 is executing within a VM 202 and that is cleared if the application enclave 204 is not executing within a VM 202. Similarly, the attributes may include a VMM flag that is set if the application enclave 204 is executing within a VMM 206 and that is cleared if the application enclave 204 is not executing within a VMM 206. One potential embodiment of an attributes field that may be included in the report is shown below in Table 2. In some embodiments, in block 324, the attestation report may include a source address field that indicates the source address of a process that created the application enclave 204. For example, the source address may include the address of the process from which the ECREATE instruction was invoked to create the application enclave 204. In some embodiments, the source address field may include a part of the complete address, such as a memory page offset, page number, segment address, or other part of the address. One potential embodiment of a report structure including the source address field is shown below in Table 1.

message authentication code, or other verification data included in the report. The virtualization context table 210 may include the VM/VMM virtualization context, the source address, and/or other virtualization context data for each application enclave 204 executed by the computing device 102.

In block 328, the PSE 208 enforces the container-enclave policy 212 based on the virtualization context of the application enclave 204. The PSE 208 may allow or deny access to platform features, local functions, and other operations based on the virtualization context. The PSE 208 may instruct or otherwise cause the VMM 206 to take appropriate policy enforcement actions. The policy determination may be based on the VM/VMM context of the application enclave 204 and/or the identity of the containing process of the application enclave 204. Each application enclave 204 may be associated with a different container-enclave policy 212. In some embodiments, in block 330 the PSE 208 may allow or deny access to one or more functions based on the virtualization context. The functions may be, for example, local functions of the application enclave 204 or its containing process, functions provided by the VMM 206 or other supervisor process of the computing device 102, or any

TABLE 1

Attestation REPORT structure.

| Field | Offset (B) | Size (B) | Description |
|---|---|---|---|
| CPUSVN | 0 | 16 | The security version number of the processor. |
| MISCSELECT | 16 | 4 | SSA Frame specified extended feature set bit vector |
| RESERVED | 20 | 28 | Must be zero |
| ATTRIBUTES | 48 | 16 | The values of the ATTRIBUTES flags for the enclave. |
| MRENCLAVE | 64 | 32 | The value of SECS.MRENCLAVE |
| RESERVED | 96 | 32 | Reserved |
| MRSIGNER | 128 | 32 | The value of SECS.MRSIGNER |
| RESERVED | 160 | 96 | Zero |
| ISVPRODID | 256 | 02 | Enclave PRODUCT ID |
| ISVSVN | 258 | 02 | The security version number of the Enclave |
| RESERVED | 260 | 60 | Zero |
| REPORTDATA | 320 | 64 | A set of data used for communication between the enclave and the target enclave. |
| KEYID | 384 | 32 | Value for key wear-out protection |
| SRCADDR | 416 | 8 | Page address where ECREATE was called |
| MAC | 424 | 16 | The CMAC on the report using report key |

TABLE 2

ATTRIBUTES field of REPORT structure.

| Field | Bit Position | Description |
|---|---|---|
| RESERVED | 0 | |
| DEBUG | 1 | If 1, the enclave permit debugger to read and write data to enclave |
| MODE64BIT | 2 | Enclave runs in 64-bit mode |
| RESERVED | 3 | Must be Zero |
| PROVISIONKEY | 4 | Provisioning Key is available from EGETKEY |
| EINITTOKENKEY | 5 | EINIT token key is available from EGETKEY |
| VMM-bit | 6 | Enclave has VMM context |
| VM-bit | 7 | Enclave has VM context |
| RESERVED | 63:8 | |
| XFRM | 127:64 | XSAVE Feature Request Mask. |

In block 326, the PSE 208 updates the virtualization context table 210 based on the report received from the application enclave 204. Of course, the PSE 208 may verify the local attestation report before updating the virtualization context table 210, for example by verifying a signature, other local process. In some embodiments, the functions may be embodied as security services or other hardware functions provided by the manageability engine 134 or other secure hardware component. The container-enclave policy 212 may identify functions, for example, by name, address, or other identifier. In some embodiments, in block 332, the PSE 208 may evaluate the container-enclave policy 212 based on the VM flag and/or the VMM flag of the attestation report. Different functions may be allowed or denied based on the virtualization context. For example, an application enclave 204 may be allowed to invoke certain local functions when executing within a VM 202 (VM flag set) but not allowed to invoke those functions when executing within a VMM 206 (VMM flag set). As another example, an application enclave 204 may be allowed to access certain functions when executed in a process without virtualization (VM flag cleared and VMM flag cleared). In some embodiments, in block 334, the PSE 208 may evaluate the container-enclave policy 212 based on the source address of the application enclave 204. The source address may be compared to a predetermined list of allowed addresses, which may be associated with processes or VMs 202. For example, an application enclave 204 may be allowed or denied to execute only within a particular user process or VM 202. Continuing that example, an application enclave 204 may be allowed to access certain functions (e.g., functions of the manageability engine 134 or other hardware functions) when executed within a service VM 202 or other predetermined VM 202 of the computing device 102. After enforcing the container-enclave policy 212, the method 300 loops back to block 316 to continue monitoring and enforcing the container-enclave policy 212 for the application enclaves 204.

Figure 4:
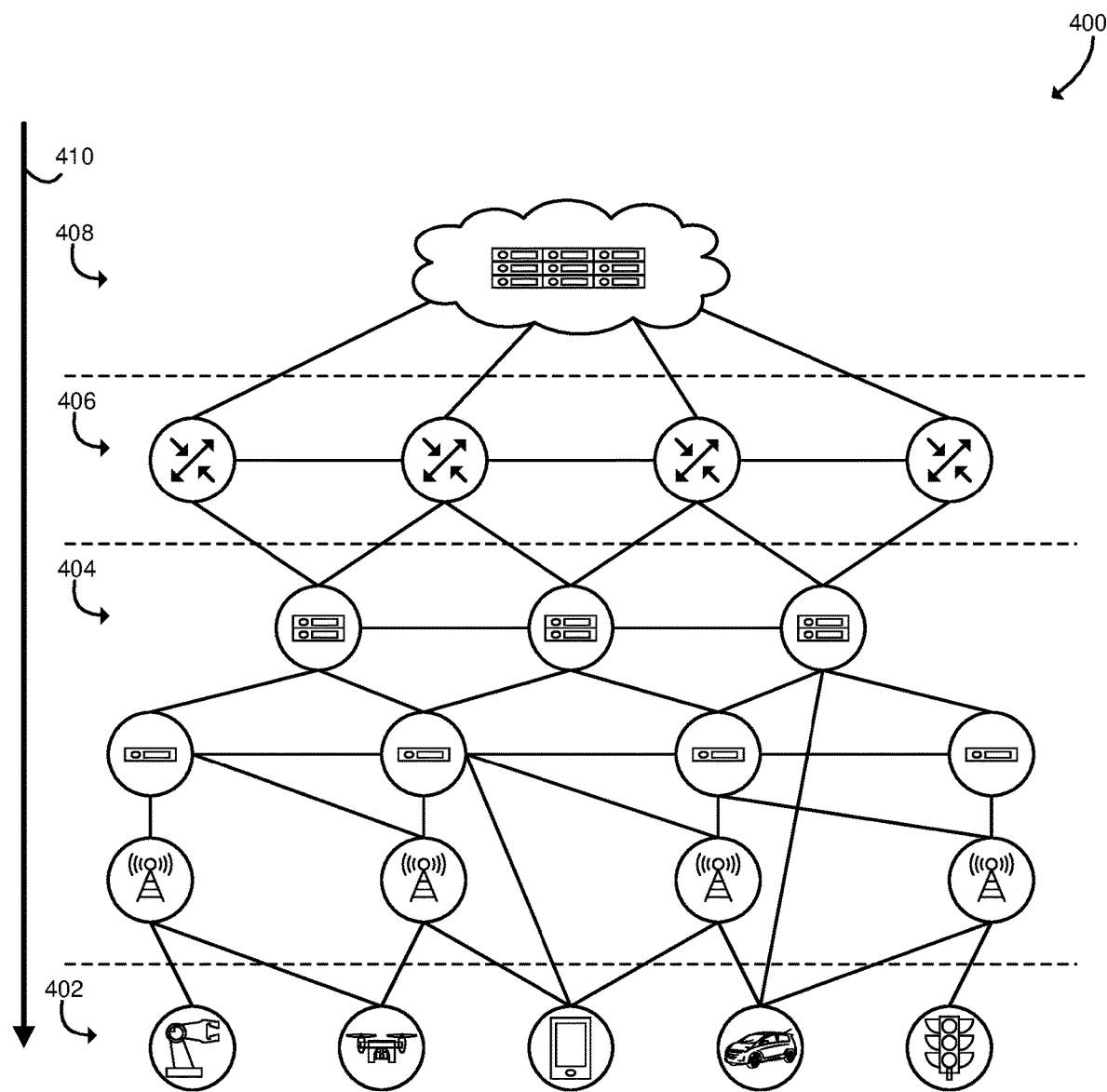
FIG. 4 is a simplified block diagram of at least one embodiment of an edge architecture that may include the system of FIGS. 1-2.

Referring now to FIG. 4, diagram 400 shows an edge architecture that may include the system 100. As shown, the edge architecture includes multiple layers 402, 404, 406, 408. Each layer includes multiple nodes that may communicate with an edge fabric to other nodes of the same layer and/or nodes at other layers. Instances of the computing device 102 may be included at one or more different layers 402, 404, 406, 408. For example, the computing device 102 may be embodied as an edge node server, edge gateway, endpoint device, or other device in the edge architecture. The things/endpoint layer 402 may include large numbers of endpoint devices (e.g., computing devices 102) that are heterogeneous, may be mobile, and are widely distributed geographically. The access/edge layer 404 may include access network components such as wireless towers, access points, base stations, intermediate nodes, gateways, fog nodes, central offices, and other access network or edge components. As described above, the access/edge layer 404 may include the computing device 102 and/or the edge orchestrator 104. Components of the access/edge layer 404 may be distributed at the building, small cell, neighborhood, or cell scale. Thus, components of the access/edge layer 404 may be relatively close in physical proximity to components of the things/endpoint layer 402. The core network layer 406 may include core network routers, network gateways, servers, and other more-centralized computing devices. Components of the core network layer 406 may be distributed regionally or nationally. The cloud/Internet layer 408 may include Internet backbone routers, cloud service providers, datacenters, and other cloud resources. The components of the cloud/Internet layer 408 may be distributed globally.

As shown, the edge architecture is organized according to a logical gradient 410 from global, cloud-based components toward local, endpoint devices. Components that are closer to the network edge (i.e., closer to the endpoint layer 402) may be smaller but more numerous, with fewer processing resources and lower power consumption, as compared to components that are closer to the network core (i.e., closer to the cloud/Internet layer 408). However, network communications among components closer to the network edge may be faster and/or have lower latency as compared to communications that traverse through layers closer to the network core. The same logical gradient 410 may apply to components within a layer. For example, the access/edge layer 404 may include numerous, widely spread base stations, street cabinets, and other access nodes as well as less-numerous but more sophisticated central offices or other aggregation nodes. Thus, by including secure orchestration in the access/edge layer 404 or other components close to the network edge, the system 100 may improve latency and performance as compared to traditional cloud-computing architectures.

It should be appreciated that, in some embodiments, the method 300 may be embodied as various instructions stored on a computer-readable media, which may be executed by the compute engine 120, the I/O subsystem 126, the manageability engine 134, and/or other components of the computing device 102 to cause the computing device 102 to perform the method 300. The computer-readable media may be embodied as any type of media capable of being read by the computing device 102 including, but not limited to, the memory 128, the data storage device 130, firmware devices, other memory or data storage devices of the computing device 102, portable media readable by a peripheral device of the computing device 102, and/or other media.

EXAMPLES

Illustrative examples of the technologies disclosed herein are provided below. An embodiment of the technologies may include any one or more, and any combination of, the examples described below.

Example 1 includes a computing device for secure virtualization, the computing device comprising: a processor with secure enclave support and virtualization support; and a platform services enclave to request a local attestation report from an application enclave of the computing device; wherein the processor is to generate, with the secure enclave support and in response to an invocation by the application enclave, an attestation report, wherein the attestation report is indicative of a virtualization context of the application enclave, wherein the virtualization context is maintained by the virtualization support of the processor; and wherein the platform services enclave is to enforce a container-enclave policy based on the virtualization context of the application enclave.

Example 2 includes the subject matter of Example 1, and wherein the application enclave is to invoke an EREPORT processor instruction of the processor.

Example 3 includes the subject matter of any of Examples 1 and 2, and wherein the attestation report includes a flag indicative of whether the application enclave is launched within a virtual machine monitor.

Example 4 includes the subject matter of any of Examples 1-3, and wherein the attestation report includes a flag indicative of whether the application enclave is launched within a virtual machine.

Example 5 includes the subject matter of any of Examples 1-4, and wherein the attestation report includes a source address of a creating process of the application enclave.

Example 6 includes the subject matter of any of Examples 1-5, and wherein the source address comprises a memory page offset of a processor instruction that creates the application enclave.

Example 7 includes the subject matter of any of Examples 1-6, and wherein the processor instruction comprises an ECREATE processor instruction.

Example 8 includes the subject matter of any of Examples 1-7, and wherein the platform services enclave is further to update a virtualization context table as a function of the local attestation report.

Example 9 includes the subject matter of any of Examples 1-8, and wherein to enforce the container-enclave policy comprises to control access to a local function of the computing device based on the virtualization context of the application enclave.

Example 10 includes the subject matter of any of Examples 1-9, and wherein to enforce the container-enclave policy comprises to control access to a hardware function of a hardware security module of the computing device based on the virtualization context of the application enclave.

Example 11 includes the subject matter of any of Examples 1-10, and wherein to enforce the container-enclave policy comprises to determine whether the application enclave is launched within a virtual machine monitor or whether the application enclave is launched within a virtual machine.

Example 12 includes the subject matter of any of Examples 1-11, and wherein to enforce the container-enclave policy comprises to compare a source address of a creating process of the application enclave to a predetermined source address associated with the application enclave.

Example 13 includes the subject matter of any of Examples 1-12, and further comprising a virtual machine monitor to maintain a list of virtual machine source addresses associated with virtual machines that are successfully loaded by the computing device, wherein the predetermined source address is included in the list of virtual machine source addresses.

Example 14 includes the subject matter of any of Examples 1-13, and further comprising: a policy manager to securely provision the container-enclave policy to the computing device; and a virtual machine monitor to construct the platform services enclave in response to secure provisioning of the container-enclave policy, wherein the platform service enclave includes the container-enclave policy.

Example 15 includes the subject matter of any of Examples 1-14, and further comprising a manageability engine, wherein to securely provision the container-enclave policy comprises to receive, by the manageability engine, the container-enclave policy from an external orchestrator.

Example 16 includes the subject matter of any of Examples 1-15, and wherein the manageability engine is further to inject the container enclave policy into an image of the virtual machine monitor.

Example 17 includes the subject matter of any of Examples 1-16, and wherein to construct the platform services enclave comprises to load the container-enclave policy with hardware I/O virtualization protection.

Example 18 includes the subject matter of any of Examples 1-17, and wherein to construct the platform services enclave comprises to securely provision the container-enclave policy to the platform services enclave with a provisioning key.

Example 19 includes a method for secure virtualization, the method comprising: requesting, by a platform services enclave of a computing device, a local attestation report from an application enclave of the computing device; generating, by the application enclave, an attestation report using secure enclave support of a processor of the computing device, wherein the attestation report is indicative of a virtualization context of the application enclave, wherein the virtualization context is provided by virtualization support of the processor; and enforcing, by the platform services enclave, a container-enclave policy based on the virtualization context of the application enclave.

Example 20 includes the subject matter of Example 19, and wherein generating the attestation report comprises invoking an EREPORT processor instruction of the processor.

Example 21 includes the subject matter of any of Examples 19 and 20, and wherein the attestation report includes a flag indicative of whether the application enclave is launched within a virtual machine monitor.

Example 22 includes the subject matter of any of Examples 19-21, and wherein the attestation report includes a flag indicative of whether the application enclave is launched within a virtual machine.

Example 23 includes the subject matter of any of Examples 19-22, and wherein the attestation report includes a source address of a creating process of the application enclave.

Example 24 includes the subject matter of any of Examples 19-23, and wherein the source address comprises a memory page offset of processor instruction that creates the application enclave.

Example 25 includes the subject matter of any of Examples 19-24, and wherein the processor instruction comprises an ECREATE processor instruction.

Example 26 includes the subject matter of any of Examples 19-25, and further comprising updating, by the platform services enclave, a virtualization context table as a function of the local attestation report.

Example 27 includes the subject matter of any of Examples 19-26, and wherein enforcing the container-enclave policy comprises controlling access to a local function of the computing device based on the virtualization context of the application enclave.

Example 28 includes the subject matter of any of Examples 19-27, and wherein enforcing the container-enclave policy comprises controlling access to a hardware function of a hardware security module of the computing device based on the virtualization context of the application enclave.

Example 29 includes the subject matter of any of Examples 19-28, and wherein enforcing the container-enclave policy comprises determining whether the application enclave is launched within a virtual machine monitor or whether the application enclave is launched within a virtual machine.

Example 30 includes the subject matter of any of Examples 19-29, and wherein enforcing the container-enclave policy comprises comparing a source address of a creating process of the application enclave to a predetermined source address associated with the application enclave.

Example 31 includes the subject matter of any of Examples 19-30, and further comprising maintaining, by the computing device, a list of virtual machine source addresses associated with virtual machines that are successfully loaded by the computing device, wherein the predetermined source address is included in the list of virtual machine source addresses.

Example 32 includes the subject matter of any of Examples 19-31, and further comprising: securely provisioning, by the computing device, the container-enclave policy to the computing device; and constructing, by the computing device, the platform services enclave by a virtual machine monitor of the computing device in response to securely provisioning the container-enclave policy, wherein the platform service enclave includes the container-enclave policy.

Example 33 includes the subject matter of any of Examples 19-32, and wherein securely provisioning the container-enclave policy comprises receiving, by a manageability engine of the computing device, the container-enclave policy from an external orchestrator.

Example 34 includes the subject matter of any of Examples 19-33, and further comprising injecting, by the manageability engine, the container enclave policy into an image of the virtual machine monitor.

Example 35 includes the subject matter of any of Examples 19-34, and wherein constructing the platform services enclave comprises loading the container-enclave policy with hardware I/O virtualization protection.

Example 36 includes the subject matter of any of Examples 19-35, and wherein constructing the platform services enclave comprises securely provisioning the container-enclave policy to the platform services enclave with a provisioning key.

Example 37 includes a computing device comprising: a processor; and a memory having stored therein a plurality of instructions that when executed by the processor cause the computing device to perform the method of any of Examples 19-36.

Example 38 includes one or more non-transitory, computer-readable storage media comprising a plurality of instructions stored thereon that in response to being prepared for execution and subsequently being executed result in a computing performing the method of any of Examples 19-36.

Example 39 includes a computing device comprising means for performing the method of any of Examples 19-36.

The invention claimed is:

1. A computing device for secure virtualization, the computing device comprising:
    a processor with secure enclave support and virtualization support; and
    a platform services enclave to request a local attestation report from an application enclave of the computing device;
    wherein the processor is to generate, with the secure enclave support and in response to an invocation by the application enclave, an attestation report, wherein the attestation report is indicative of a virtualization context of the application enclave, wherein the virtualization context is provided by the virtualization support of the processor, and wherein the virtualization context includes whether the application enclave is launched within a virtual machine; and
    wherein the platform services enclave is to enforce a container-enclave policy based on the virtualization context of the application enclave.

2. The computing device of claim 1, wherein the attestation report includes a flag indicative of whether the application enclave is launched within a virtual machine monitor.

3. The computing device of claim 1, wherein the attestation report includes a flag indicative of whether the application enclave is launched within a virtual machine.

4. The computing device of claim 1, wherein the attestation report includes a source address of a creating process of the application enclave.

5. The computing device of claim 4, wherein the source address comprises a memory page offset of a processor instruction that creates the application enclave.

6. The computing device of claim 1, wherein to enforce the container-enclave policy comprises to control access to a local function of the computing device based on the virtualization context of the application enclave.

7. The computing device of claim 1, wherein to enforce the container-enclave policy comprises to control access to a hardware function of a hardware security module of the computing device based on the virtualization context of the application enclave.

8. The computing device of claim 1, wherein to enforce the container-enclave policy comprises to determine whether the application enclave is launched within a virtual machine monitor or whether the application enclave is launched within a virtual machine.

9. The computing device of claim 1, wherein to enforce the container-enclave policy comprises to compare a source address of a creating process of the application enclave to a predetermined source address associated with the application enclave.

10. The computing device of claim 9, further comprising a virtual machine monitor to maintain a list of virtual machine source addresses associated with virtual machines that are successfully loaded by the computing device, wherein the predetermined source address is included in the list of virtual machine source addresses.

11. The computing device of claim 1, further comprising:
    a policy manager to securely provision the container-enclave policy to the computing device; and
    a virtual machine monitor to construct the platform services enclave in response to secure provisioning of the container-enclave policy, wherein the platform service enclave includes the container-enclave policy.

12. The computing device of claim 11, further comprising a manageability engine, wherein to securely provision the container-enclave policy comprises to receive, by the manageability engine, the container-enclave policy from an external orchestrator.

13. The computing device of claim 12, wherein the manageability engine is further to inject the container enclave policy into an image of the virtual machine monitor.

14. A method for secure virtualization, the method comprising:
    requesting, by a platform services enclave of a computing device, a local attestation report from an application enclave of the computing device;
    generating, by the application enclave, an attestation report using secure enclave support of a processor of the computing device, wherein the attestation report is indicative of a virtualization context of the application enclave, wherein the virtualization context is provided by virtualization support of the processor, and wherein the virtualization context includes whether the application enclave is launched within a virtual machine; and
    enforcing, by the platform services enclave, a container-enclave policy based on the virtualization context of the application enclave.

15. The method of claim 14, wherein enforcing the container-enclave policy comprises controlling access to a local function of the computing device based on the virtualization context of the application enclave.

16. The method of claim 14, wherein enforcing the container-enclave policy comprises controlling access to a hardware function of a hardware security module of the computing device based on the virtualization context of the application enclave.

17. The method of claim 14, wherein enforcing the container-enclave policy comprises determining whether the application enclave is launched within a virtual machine monitor or whether the application enclave is launched within a virtual machine.

18. The method of claim 14, wherein enforcing the container-enclave policy comprises comparing a source address of a creating process of the application enclave to a predetermined source address associated with the application enclave.

19. The method of claim 14, further comprising:
    securely provisioning, by the computing device, the container-enclave policy to the computing device; and
    constructing, by the computing device, the platform services enclave by a virtual machine monitor of the computing device in response to securely provisioning the container-enclave policy, wherein the platform service enclave includes the container-enclave policy.

20. One or more non-transitory, computer-readable storage media comprising a plurality of instructions stored thereon that, after being prepared for execution, cause a computing device that executes the prepared instructions to:

request, by a platform services enclave of the computing device, a local attestation report from an application enclave of the computing device;

generate, by the application enclave, an attestation report using secure enclave support of a processor of the computing device, wherein the attestation report is indicative of a virtualization context of the application enclave, wherein the virtualization context is provided by virtualization support of the processor, and wherein the virtualization context includes whether the application enclave is launched within a virtual machine; and enforce, by the platform services enclave, a container-enclave policy based on the virtualization context of the application enclave.

21. The one or more non-transitory, computer-readable storage media of claim 20, wherein to enforce the container-enclave policy comprises to control access to a local function of the computing device based on the virtualization context of the application enclave.

22. The one or more non-transitory, computer-readable storage media of claim 20, wherein to enforce the container-enclave policy comprises to control access to a hardware function of a hardware security module of the computing device based on the virtualization context of the application enclave.

23. The one or more non-transitory, computer-readable storage media of claim 20, wherein to enforce the container-enclave policy comprises to determine whether the application enclave is launched within a virtual machine monitor or whether the application enclave is launched within a virtual machine.

24. The one or more non-transitory, computer-readable storage media of claim 20, wherein to enforce the container-enclave policy comprises to compare a source address of a creating process of the application enclave to a predetermined source address associated with the application enclave.

25. The one or more non-transitory, computer-readable storage media of claim 20, further comprising a plurality of instructions that, after being prepared for execution, cause the computing device that executes the prepared instructions to:

securely provision the container-enclave policy to the computing device; and construct the platform services enclave by a virtual machine monitor of the computing device in response to securely provisioning the container-enclave policy, wherein the platform service enclave includes the container-enclave policy.

* * * * *